Dec. 3, 1968  A. G. McNEILL  3,414,350
AUXILIARY CLIP-ON SPECTACLES
Filed June 17, 1965
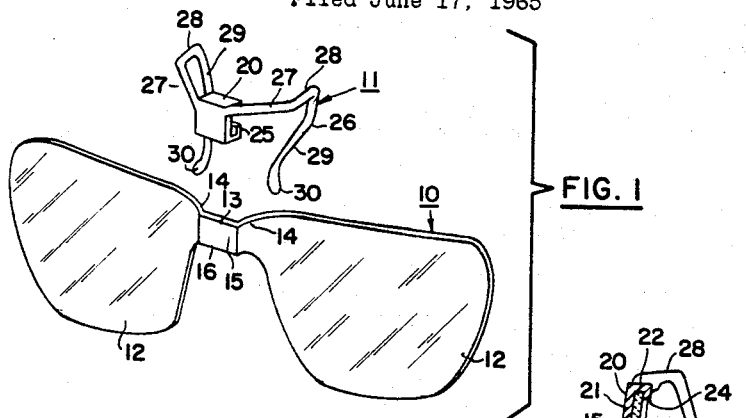
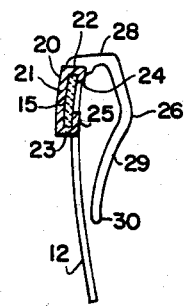
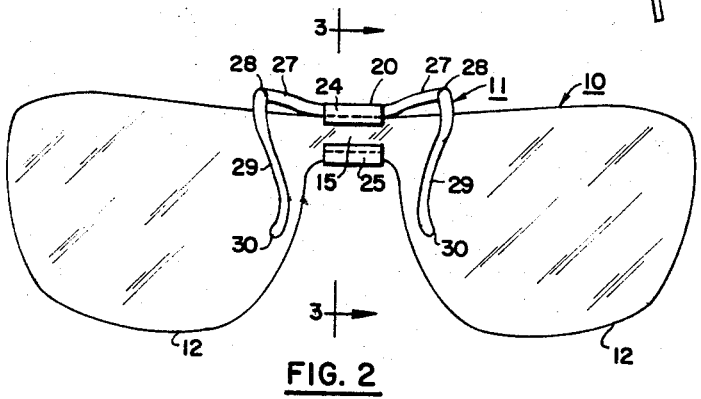
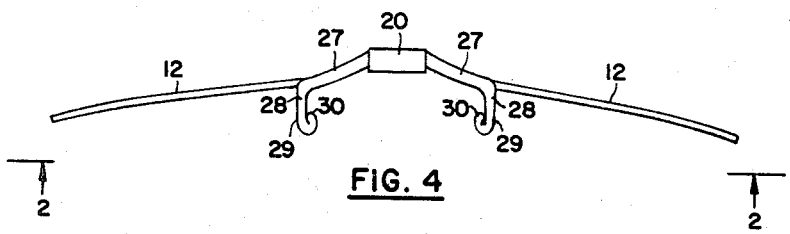
INVENTOR.
ALBERT G. MCNEILL
BY Robertson and Youtie
ATTORNEY.

United States Patent Office 3,414,350
Patented Dec. 3, 1968

3,414,350
AUXILIARY CLIP-ON SPECTACLES
Albert G. McNeill, Maple Glen, Pa., assignor to Bachmann Bros., Inc., Philadelphia, Pa., a corporation of Pennsylvania
Filed June 17, 1965, Ser. No. 464,680
2 Claims. (Cl. 351—58)

ABSTRACT OF THE DISCLOSURE

An auxiliary spectacle for attachment to eye-glasses which includes a unitary lens structure having a pair of side-by-side lens parts and a connecting bridge, and a unitary clip structure which includes a snap engaged about the bridge and a pair of legs extending from the snap into spaced facing relation with respective lens parts.

---

This invention relates generally to auxiliary spectacles, and is especially concerned with clip-on type auxiliary spectacles, say for engagement in front of conventional spectacles to shade or filter bright sunlight.

It is an important object of the present invention to provide an auxiliary-spectacle construction of the type described which is extremely economical to manufacture, requiring a minimum of parts, and which can be rapidly assembled with a minimum of skill and equipment.

It is a further object of the present invention to provide a clip-on spectacle construction having the advantageous characteristics mentioned in the preceding paragraph, wherein only two components are necessary to fabricate the entire spectacle, and wherein assembly does not require the securement of fasteners of any kind.

It is a further object of the present invention to provide an auxiliary spectacle of the type described wherein the component parts thereof may be quickly and economically manufactured by mass-production techniques, to produce an auxiliary spectacle of neat and attractive appearance and capable of high esthetic appeal.

It is still a further object of the present invention to provide an auxiliary-spectacle construction of the type described which is capable of withstanding the frequent handling incident to placement and removal of auxiliary spectacles, being durable and reliable in use throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is an exploded, top perspective view showing the component parts of an auxiliary spectacle constructed in accordance with the teachings of the present invention;

FIGURE 2 is a rear elevational view of the assembled auxiliary spectacle of the present invention as seen along line 2—2 of FIGURE 4;

FIGURE 3 is a sectional view taken generally along the line 3—3 of FIGURE 2; and FIGURE 4 is a top plan view of the present auxiliary-spectacle construction.

Referring now more particularly to the drawings, and specifically to FIGURE 1 thereof, the instant auxiliary or clip-on spectacle comprises two component parts, a unitary lens structure generally designated 10, and a unitary clip structure, generally designated 11.

The lens structure 10 may advantageously be integrally fabricated of plastic material suitable for sunglass lenses, or the like, as by injection molding or other suitable means. The unitary lens structure includes a pair of substantially identical lens parts 12 having essentially conventional lens configuration, and of opposite hand. The pair of lens parts 12 are arranged in side-by-side spaced relation, being generally coplanar in the manner of a spectacle front. Connecting the adjacent upper regions of the lens parts 12 is a bridge 13. The bridge 13 may include a pair of side portions 14 extending obliquely inward and forward from each lens part 12, and a medial portion 15 extending laterally between and interconnecting the side portions 14. The medial bridge portion 15 is of reduced vertical extent, as by a generally rectangular notch 16 formed in the lower edge of the medial portion.

While the unitary lens structure 10 may be integrally molded, it is generally of substantially flat or sheetlike conformation and may also be formed of sheet material, if desired. As best seen in the top view of FIGURE 4, the overall configuration of the lens structure 10 is forwardly bowed, having its bridge 13 generally forward of the extremities of the lens parts 12. Further, the lens structure 10 is advantageously fabricated of material having at least slight resiliency, for a purpose appearing presently.

The clip 11 is also admirably well suited for integral formation, as by molding, and includes a centrally or medially located snap 20 of generally C-shaped configuration. As best seen in FIGURE 3, the snap 20 includes a front wall 21, upper and lower walls 22 and 23 extending respectively from the top and bottom of the front wall, and inturned lips 24 and 25 on the inner ends of the upper and lower walls. One lip, say the lower lip 25 may be of greater extent than the other. That is, the upper lip 24 depends from the inner end of the upper wall 22, and the lower lip 25 upstands from the inner end of the lower wall 23, the lower lip upstanding a greater distance than the upper lip depends.

Extending from opposite sides of the snap 20 are a pair of substantially identical legs 26, which legs are of opposite hand. More specifically, each leg 26 includes an inner portion 27 extending laterally outwardly from opposite sides of the upper snap wall 22, an upper portion 28 projecting generally rearwardly from the outer end of each inner portion 27, and a depending portion 29 depending from the projecting end of each upper portion. The lower, free ends of the depending portions 29 may be smoothly rounded, as at 30.

The above-described clip 11 may advantageously be integrally fabricated, as by molding or otherwise, of plastic material having suitable resiliency. By this resiliency the snap 20 may be engaged about the medial bridge portion 15, as shown in FIGURE 3. That is, the lower snap wall 23 may be inserted upward into the medial bridge notch 16, with the snap wall 21 in front of the bridge and the snap lip 25 rearward of the bridge. The snap may then be distended to snap the upper lip 24 over the upper edge of the bridge to assume the condition shown in FIGURE 3. It will there be apparent that the snap conformably engages about the bridge, the latter being of generally rectangular, or noncircular configuration, to resist rotation of the snap relative to the bridge. Further, the lateral extent of the snap 20 is approximately equal to or slightly less than the width of notch 16, to effectively limit or prevent sliding of the snap on the bridge.

In the above-described assembled condition of snap 20 conformably engaged about bridge 13, the inner portions 27 of legs 26 extend oppositely outward from the snap generally along the upper edges of the bridge and adjacent portions of the lens parts 12. The upper leg portions 28 project inward beyond and generally normal to the lens parts 12, and the depending portions 29 depend downward on the inner side of and behind the respective lens parts 12.

In this assembled condition it is only necessary to slip the auxiliary spectacle of FIGURES 2-4 over a conventional spectacle front with the lens parts 12 in front of the conventional spectacle lenses, and the leg portions 29 engaging the inner surfaces of the conventional lenses. Firm retention of the auxiliary spectacles in position on conventional spectacles is assured by the resilience of legs 26, and also by the resilient deflectability of the generally arcuate or bowed unitary lens structure 10, so that the outer extremities thereof will engage with the forward surface of a conventional lens front. Repeated removal and replacement of the instant auxiliary spectacle with respect to conventional spectacles may be made with rapidity and ease, and without damage to the spectacles.

From the foregoing, it is seen that the present invention provides an auxiliary-spectacle construction which fully accomplishes its intended objects and is well adapted to meet practical conditions of manufacture, assembly and use.

Although the present invention has been described in some detail by way of illustration and example for purposes of clarity of understanding, it is understood that certain changes and modifications may be made within the spirit of the invention and scope of the appended claims.

What is claimed is:

1. An auxiliary spectacle comprising a unitary lens structure of integral sheetlike formation including a pair of side-by-side spaced lens parts, and a bridge connecting the adjacent upper regions of said lens parts, said bridge having a reduced medial portion of generally rectangular cross-sectional configuration; and an integral clip structure of resilient molded plastic including a C-shaped member conformably snap engaged in nonsliding relation about said reduced medial bridge portion, and a pair of legs extending from said snap and depending into spaced facing relation relative to respective lens parts, for engagement of said lens parts and legs on opposite sides of a spectacle front.

2. An auxiliary spectacle according to claim 1, said legs each including an upper portion adjacent to the upper edge of said lens structure and projecting generally normal thereto, and a lower portion depending from the projecting end of said upper portion.

References Cited

UNITED STATES PATENTS

| | | | |
|---|---|---|---|
| 2,516,764 | 7/1950 | Ehlert et al. | 351—58 |
| 2,737,848 | 3/1956 | Crane | 351—48 |
| 3,189,913 | 6/1965 | Hoffmaster | 2—13 X |

DAVID SCHONBERG, *Primary Examiner.*

J. W. LEONARD, *Assistant Examiner.*